United States Patent [19]

Adams et al.

[11] Patent Number: 5,377,954
[45] Date of Patent: Jan. 3, 1995

[54] VALVE WITH SEAL RING HAVING EDGE-WELDED LAMINATIONS

[75] Inventors: Siegbert Adams, Bochum; Thomas Heitmann, Herne, both of Germany

[73] Assignee: Adams GmbH & Co. Armaturen KG, Herne, Germany

[21] Appl. No.: 163,141

[22] Filed: Dec. 6, 1993

[51] Int. Cl.⁶ .............................................. F16K 1/22
[52] U.S. Cl. .................................... 251/306; 251/316; 251/363
[58] Field of Search ............... 251/305, 306, 307, 316, 251/317, 363

[56] References Cited

U.S. PATENT DOCUMENTS

| | | | |
|---|---|---|---|
| 3,905,577 | 9/1975 | Karpinko | 251/306 X |
| 4,303,249 | 12/1981 | Illy | 251/306 X |
| 4,863,144 | 9/1989 | Wilson et al. | 251/363 X |

*Primary Examiner*—John C. Fox
*Attorney, Agent, or Firm*—Townsend and Townsend Khourie and Crew

[57] ABSTRACT

Disclosed is a disc valve with a laminated seal ring secured to the housing which forms a leakproof seal with a seating surface on the valve disc. The seal ring is made of two or more metal laminates, the outer peripheral edges of which are cold welded together, by WIG welding or laser welding, for example, to prevent any leakage of fluid pass the opposing, abutting surfaces of the laminations. A bolt-tightened pressure ring presses the laminated seal ring in an axial direction against an axially oriented support face of the housing. An axially open groove in support face is covered by the proximate seal ring lamination and is filled with a graphite gasket to prevent leakage behind the seal ring. Alternatively, the laminated seal ring can be mounted on the disc and the cooperating valve seat is formed on the housing.

29 Claims, 3 Drawing Sheets

VALVE WITH SEAL RING HAVING EDGE-WELDED LAMINATIONS

BACKGROUND OF THE INVENTION

The present invention relates to laminated metal seal rings for valves handling high pressure, high temperature and/or highly corrosive fluids and, in particular, to such valves with a laminated metal seal rings.

Expired U.S. Pat. No. 3,442,488 discloses a disc valve in which a disc is pivotable between an open position, in which the disc is substantially parallel to an axis through the housing, and a closed position in which the disc is generally transverse to the housing. The pivot axis of this disc is offset with respect to the main axis through the housing. This patent discloses to install the seal ring on the disc.

U.S. Pat. No. 4,281,817 discloses a similar valve in which the seal ring is in the housing and includes a radially inwardly projecting sealing surface which engages and cooperates with a peripheral sealing surface of the disc to form a fluid-tight seal when the disc is in its closed position. As is typical for such valves, the housing includes an enlarged diameter recess in a portion of the flow passage through it which extends from an end of the housing to an axially oriented seal ring support surface. The seal ring is placed against this support surface so that its sealing surface faces radially inward and a retainer ring, also disposed in the enlarged diameter recess, is secured to the housing.

In an improved version of the valve disclosed in the '817 patent available from the assignee of the present application, the seal ring mounting retainer ring is mounted to the housing without bolts and is spaced from the seal ring. A plurality of set screws carried by the retainer ring are tightened against the seal ring, directly or via an intervening pressure ring, to force the seal ring against the support surface of the housing and to maintain it in position.

Seal ring installations as described in the preceding paragraph work well so long as the seal ring is constructed of a compressible material, such as elastomers, and is subjected to relatively low pressure, low heat and/or is used with non-corrosive fluids. For high temperature or high pressure applications, or when used with corrosive fluids, the seal ring must be constructed of metal, such as stainless steel laminations. It is difficult to prevent leakage, or at least the seepage of some pressurized fluid past the abutting lamination surfaces, particularly when relatively higher fluid pressures are encountered. In the past this was readily solved by placing thin layers of an asbestos material between the opposing lamination surfaces. Once the axial mounting force is applied to the laminated seal ring, the asbestos layer between the laminations prevents fluid from seeping past it.

Because of the well-known health hazard presented by asbestos, it is no longer acceptable as a material for placement between the laminations to prevent leakage past them.

The simple application of a greater axial force against the seal ring laminations to prevent any fluid seepage between them is not feasible because even microscopic surface irregularities on the laminations can lead to leakage. Moreover, the laminations are thin; they normally have a thickness of no more than 1 mm and, typically, they have thicknesses less than that. Such thin laminations have no rigidity in the direction in which the holding forces are applied. This can lead to a slight warpage or deflection of the laminations over their circumference which can again lead to fluid seepage between the laminations.

As a result thereof, it continues to be necessary to place a gasket material between the laminations of the seal ring. The only feasible material capable of withstanding the high temperatures and resisting corrosion from many corrosive fluids handled by such valves is graphite. However, graphite is an essentially amorphous material which, when subjected to high pressure, acts like powdered, compressed coal without structural integrity and, therefore, has a tendency to "float" between the laminations. Thus, it is difficult to maintain a leakproof seal between laminated metal seal rings. Even when a seal was initially established, repeated cycling of the valve between its closed and open positions degenerated the graphite gasket between the laminations, which, after relatively short service times, led to leaks.

SUMMARY OF THE INVENTION

The present invention eliminates the problems that were encountered in the past when attempting to prevent the leakage of pressurized fluid past laminated metal seal rings by eliminating the need for any seals or gaskets between the opposing faces of the seal ring laminations. Instead, the laminations are placed flush against each other so that opposing lamination faces abut. Either the inner edges of the laminations or their outer, peripheral edges, are welded together in a sealproof manner so that it is impossible for fluid to leak past the abutting lamination faces. The need for placing a gasket material between the laminations, and the above-discussed problems, are thereby eliminated.

The use of a leakproof, welded edge along the inside or the outside peripheries of the seal ring laminations instead of placing a relatively soft gasket between the laminations is not easily implemented, in large part because the laminations are thin, typically less than 1 mm, and their diameter can be relatively large; for example, as much as 1 meter or more. The rings, moreover, are relatively narrow, having a width which typically is in the range of between 0.3 mm and 0.8 mm. As a result, when one of the edges is welded together, relatively large amounts of heat are nonuniformly applied to the seal ring at one point along the entire periphery where welding takes place. The resulting thermal expansions and contractions in the metal laminations cause distortions, including permanent distortions such as localized undulations which render the laminations uneven. Once permanently distorted, it becomes virtually impossible to again render such seal rings completely flat, as is necessary to establish a leakproof seal. Hence, seal rings with laminated metal which are edge-welded together have not heretofore been used.

Thus, a valve constructed in accordance with the present invention has a seal ring which is mounted to either the housing or the closure member, such as a pivoting disc of a butterfly valve, flapper valves or ball valves. The seal ring has two or more metal laminations, which, for seal rings mounted to the housing, have their peripheral outer edges welded together in a seal-proof manner. To prevent deformations of the laminations during welding, the lamination edges are "cold welded" together. For purposes of the present invention, "cold welding" refers to welding processes which release sufficiently little heat into the body of the laminations to prevent the laminations from deforming. Welding techniques suitable in this regard are intermittent welding processes in which the welding, and thereby the heat release, is periodically interrupted to limit the accumulation of heat in the laminations, "Wolfram" Inert Gas ("WIG") welding, a technique which not only generates relatively little heat but which further protects the metal laminations and the weld material against chemical reactions, oxidation, etc. by welding in an inert atmosphere, or recently developed laser welding techniques in which a laser beam is focused at the lamination edges to effect welding with a minimal amount of heat. The non-deforming effect of these welding techniques can be enhanced by employing appropriate fixtures which securely hold the laminations flat during welding. Moreover, such fixtures can be constructed so that they absorb some of the heat generated during welding to reduce the amount of heating to which the laminations are subjected.

A further aspect of the present invention provides a single, static seal to prevent leakage "behind" the seal ring. The support surface (on the housing or the disc) against which the seal ring is pressed includes a groove which is filled with a graphite gasket. When the seal ring is forced against the support surface, and thereby also against the graphite gasket, a seal is formed between the seal ring and the housing preventing fluid leakage behind the seal ring.

The edges of the seal ring laminations not welded together define a sealing surface which cooperates with a seat or seating surface on the disc, or on the housing if the seal ring is installed on the disc. In one embodiment of the present invention, the sealing surface of the seal ring is defined by oppositely curved end portions of the laminations so that, when the valve is closed, the curved portions sealingly engage the opposing valve seat.

Depending upon the size of the valve, the fluid handled by it and the operating parameters, primarily temperature and pressure, a laminated, welded seal ring constructed in accordance with the present invention has at least two laminations and may have three or more. The upper limit to the number of laminations is dictated by the ability to weld the laminations together in the above-described manner so that the laminations do not deform.

The seal ring of the present invention is not only effective in establishing a seal, it is relatively inexpensive to manufacture and, especially, to install. Moreover, the seal ring of the present invention has no gasket material layer between the laminations, which can wear out, and which, in the past, required frequent seal ring replacements. The seal ring of the present invention therefore requires significantly less maintenance, thereby reducing the overall costs of both installing and thereafter operating the valve.

DESCRIPTION OF THE PREFERRED EMBODIMENTS

Figure 1:
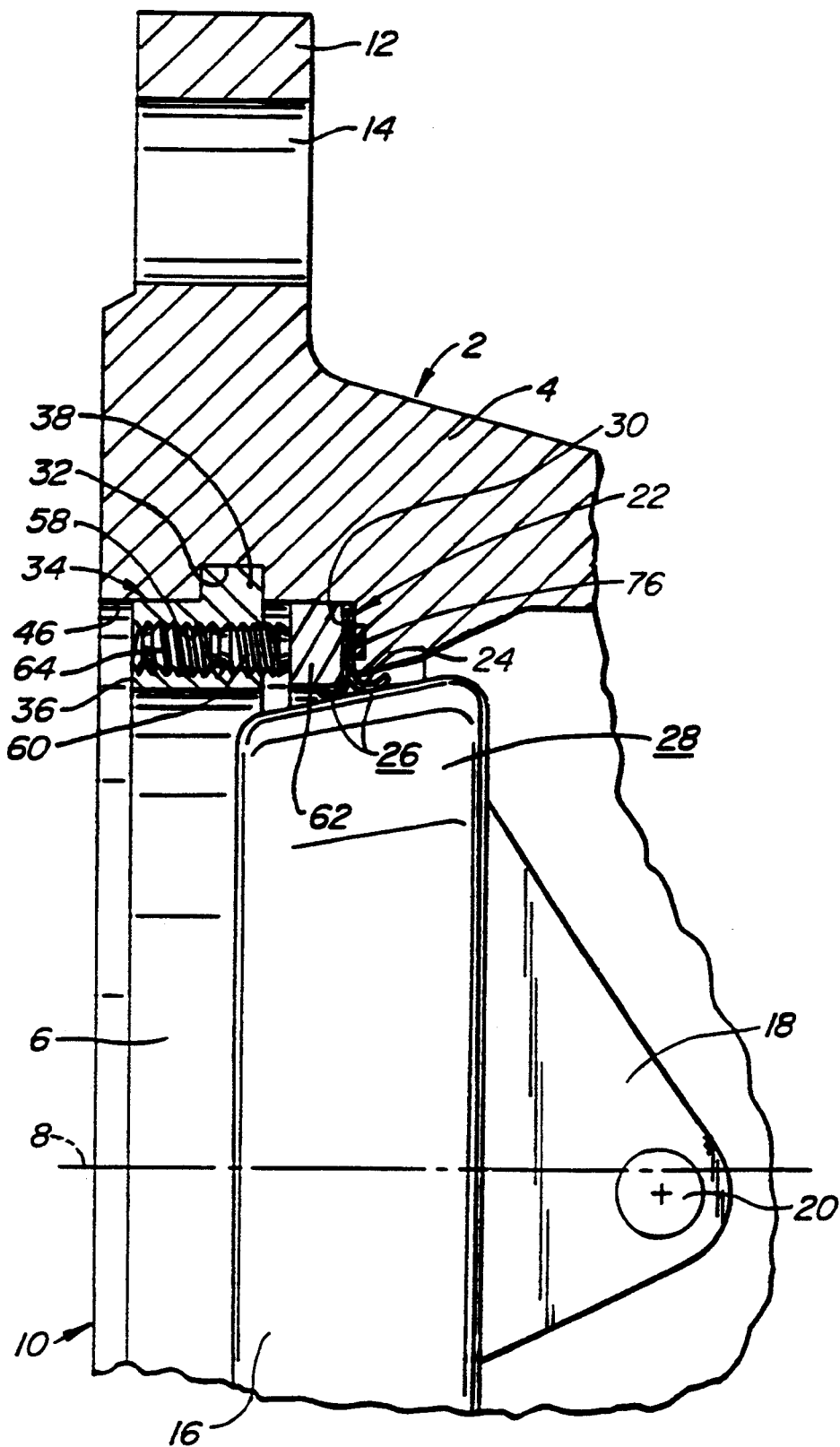
FIG. 1 is a fragmentary, side elevational view, in section, through a valve including a seal ring constructed in accordance with the present invention.

Referring to the drawings, a disc valve 2 includes a housing 4 forming a fluid flow conduit 6 along a conduit axis 8 extending from a first end 10 to a second end (not shown) of the housing. A conventional housing flange 12 extends radially outwardly from the housing at the first housing end and includes bolt holes 14 for securing the valve to a pipeline or the like (not shown) with threaded bolts (not shown). Inside the conduit there is a valve disc 16 fitted with brackets 18 which are rotationally fixed to pivot shaft 20. The axis of the pivot shaft is typically offset from the conduit axis 8. Thus, pivotal movements of the flange are imparted to the disc and move the disc between its open position (not shown) in which it is substantially parallel to the housing axis and its closed position illustrated in FIG. 1. A laminated metal seal ring 22 has a sealing surface 26 formed by a pair of oppositely curved end sections 24 of seal ring laminations 66 and engages a typically cone-shaped peripheral seat or seating surface 28 of the disc when the latter is in its closed position (illustrated in FIG. 1) to establish a leakproof seal. By pivoting the disc in a clockwise direction, as seen in FIG. 1, the seal between the seal ring and the seat on the disc is broken, and when the disc is substantially parallel to the conduit axis 8, the valve is in its fully open position.

Housing conduit 6 includes an enlarged diameter recess or portion extending from the first housing end 10 to an axially oriented support surface 30 which is spaced from and faces the first housing end. To hold the laminated seal ring 22 in place, one embodiment of the present invention employs a retainer ring 34 which is defined by an annular main body 36 and a flange 38 projecting radially outwardly therefrom. Flange 38 extends into an inwardly open, circumferential groove 32 which, for example, may have a square or a rectangular cross-section and which is spaced some distance from the face and located between it and the first housing end. Flange 38 is dimensioned so that it snugly fits into groove 32; that is, so that the flange can be seated therein by slidably inserting it. The tolerances are sufficiently tight so that there is substantially no play between the flange and the groove.

Figure 2:
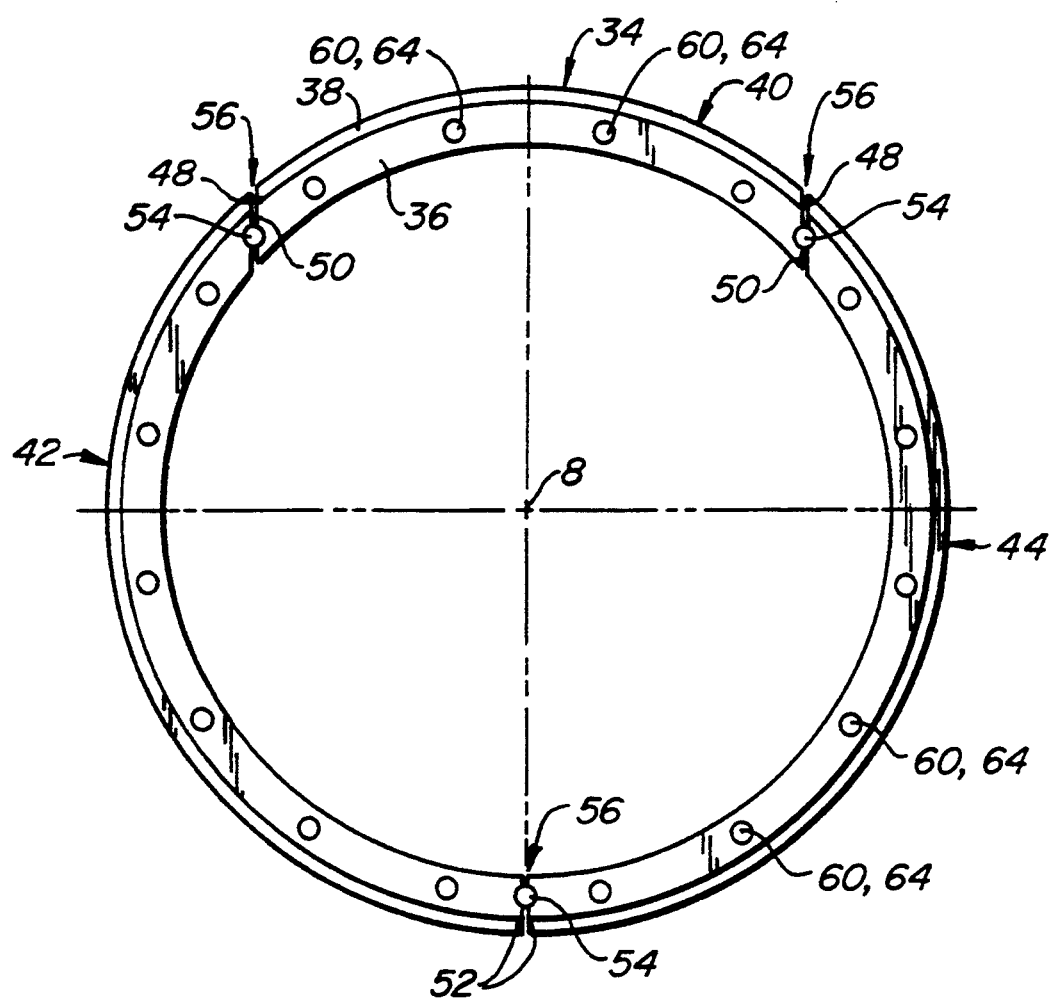
FIG. 2 is a side elevational view of a seal ring retainer ring used in the valve shown in FIG. 1.

To enable the installation of the retainer ring in the circumferential housing groove, the ring is constructed of three or more ring segments 40, 42 and 44, each extending over an arc of less than 180°. The retainer ring is installed by initially positioning the segments interiorly of valve conduit walls 46 and, thereafter, moving them radially outwardly until their flanges are seated in groove 32. This requires that the ends 48 of at least one of the retainer ring segments; e.g. first segment 40, be parallel to each other. The opposing end 50 of the adjoining ring segments 42, 44 are parallel to the edges of the first segment, as is illustrated in FIG. 2. The other opposing ends 52 of segments 42, 44 may also be parallel to each other and, preferably, they are parallel to the ends of the first segment as well to facilitate the installation of the retainer ring segments.

To prevent the first segment 40 from accidentally dropping out of its engagement with groove 32; for example, in instances in which the segment is located at the top of conduit 6, locking pins 54 are inserted in appropriately sized holes which bridge across gaps 56 between opposing ends of the retainer ring segments. The pins may be simple cylindrical pins or they may include threads, in which event the corresponding holes in the segments are also threaded. Once installed, the pins prevent relative movements between the retainer ring segments in a radial direction so that, for example, the first segment, located at the top of the conduit, cannot gravitationally drop out of groove 32.

In instances in which there are no space limitations, the retainer ring may be bolted directly to the housing (not shown), instead of securing the retainer ring with the just mentioned radial flange in a corresponding groove of the housing.

Retainer ring 34 includes several, axially oriented, threaded holes 58 which receive threaded bolts 60 the ends of which abut a pressure ring 62 which overlies the flat portion of seal ring 22, as is discussed in further detail below. By tightening bolts 60, an axial force is generated which pressures the sealing laminations 24 against each other and the seal ring as a whole against support surface 30 of the housing.

The resulting reaction force generated by bolts 60 is transferred from the bolts to main body 34 and from there via flange 38 of the retainer ring to housing 40. Since the flange snugly fits into housing groove 32, effectively no wedging takes place. Set screws 64 are tightened against threaded bolts 60 to lock the latter in place and prevent their accidental loosening.

Figure 3:
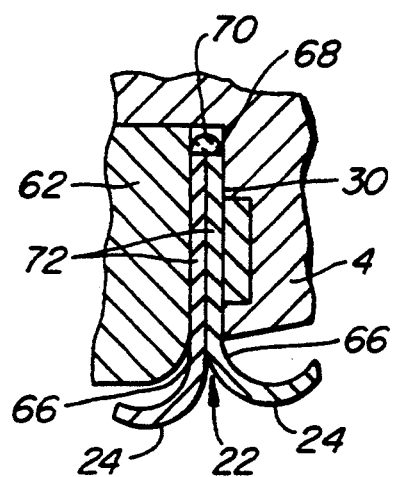
FIG. 3 is a fragmentary, enlarged view, in section, of the manner in which the seal ring of the present invention is installed in a valve.

Referring now particularly to FIGS. 1 and 3, seal ring 22 is constructed of at least two annular seal ring laminations 66, the radially inwardly facing end portions of which are defined by the earlier mentioned curved end sections 24. The radially outer edges 68 of the laminations are flush; that is, they are axially aligned, and they are secured to each other by a continuous, circumferential, leakproof weld 70. The weld is formed by "cold welding", as discussed above, such as WIG welding or laser welding, so that insufficient heat is generated to cause a deformation of laminations 66 during welding as a result of thermally induced stresses. Consequently, main portions 72 of the laminations remain flat. During welding, they are preferably tightly pressed together; for example, with a welding fixture (not shown) which facilitates keeping the opposing surfaces of the laminations in abutment.

A preferably square or rectangular groove 74 is formed in housing support surface 30 and is positioned so that the flat main portion 72 of the proximate lamination 66 overlies the groove. The groove is substantially completely filled with a gasket 76 made of graphite to withstand high temperatures and to resist attack by corrosive materials which may flow through the valve. Since the graphite gasket fills the groove and the open side of the groove is covered by the seal ring lamination, the graphite is subjected to no movements during the use of the valve and it is and during use remains locked in place within the confines of the closed groove. The heretofore troublesome floating of graphite gaskets between the sealing laminations is thereby eliminated.

Turning now to the installation and operation of the seal ring, valve disc 16 will typically be installed first, and while it is in its open position seal ring 22 is moved axially into conduit 6 until its flat portion 72 abuts axial housing surface 30 and contacts graphite gasket 76. If used, pressure ring 62 is axially inserted into the housing until it abuts the previously positioned seal ring.

Next, retainer ring segments 40, 42 and 44 are installed by sequentially inserting all segments except first segment 4 with the parallel ends 40. It is installed last by sliding it in a radial direction and parallel to its ends along the opposing end 50 of the adjoining segments until its radial flange is seated in groove 32. Locking pins are now installed to maintain the retainer ring segments in their positions and, thereafter, the sealing ring is centered relative to the seating surface 28 on the disc; for example, by closing the disc so that the seal ring centers itself. Thereafter threaded bolts 60 are tightened until they exert the desired axial force against seal ring 22 to both securely mount the seal ring to and position it in the housing and to apply the necessary force against graphite gasket 76 to form a leakproof seal between it and flat portion 72 of the overlying seal ring lamination 66.

The seal between gasket 76 and seal ring 22 prevents any leakage of pressurized fluid "behind" the seal ring; that is, from the right-hand side of the seal ring, for example, as seen in FIG. 3 along support face 30 and about the outside of weld 70 to the left-hand side of the seal ring. This seal is maintained under high pressures, high temperatures and/or when handling corrosive fluids because gasket 76 is a confined, static seal subjected to no movements.

It should be noted that seal ring 22 forms a bidirectionally leakproof seal because the graphite gasket 76 prevents leakage behind the seal ring in both directions and curved end sections 24 of the laminations are biased into firm, sealing engagement with seat 28 irrespective of which side of the seal ring is pressurized.

As an alternative to the seal ring construction and installation of the present invention described above, the seal ring can be mounted on valve disc 16 (not shown) instead of in housing 4. In such an event, the peripherally outer end portions of the seal ring laminations are oppositely curved, and the radially inner edges of the laminations are welded together. In this case, the housing forms a seating surface which sealingly engages the curved end sections of the seal ring. Further, the seal ring can be constructed of more than two laminations. For example, a third, flat lamination (not shown) can be placed between two laminations constructed as shown in FIGS. 1 and 3. As a further alternative, the third lamination may include an end section which is curved in one or the other direction to correspond to the curvature of the outer seal ring laminations. Additional seal rings, flat or with curved end sections, can of course be added subject to an ability to weld the segments together in a leakproof manner without deforming the laminations.

What is claimed is:

1. A laminated seal ring for a valve for establishing a seal along a seat of the valve, the seal ring comprising first and second, aligned, flat annular laminations constructed of a metal, opposing surfaces of the laminations being in mutual abutment, each lamination defining an inner edge and an outer edge, means proximate one of the inner and outer edges of the laminations defining a sealing surface of the seal ring for engaging the valve seat, and a metal weld connecting the laminations along their other edges, the weld being leakproof to prevent the passage of fluid between abutting surfaces of the laminations.

2. A seal ring according to claim 1 wherein the weld is formed along the outer edges of the laminations.

3. A seal ring according to claim 1 wherein the means defining a sealing surface comprises oppositely curved portions of the laminations defining said one of the edges, the portions curving in opposite directions.

4. A seal ring according to claim 3 wherein the curved portions define the inner edges of the laminations.

5. A seal ring according to claim 1 wherein the metal is stainless steel.

6. A seal ring according to claim 5 wherein the weld is formed by WIG welding.

7. A seal ring according to claim 5 wherein the weld is formed by laser welding.

8. A seal ring according to claim 1 comprising at least three laminations.

9. A valve comprising a housing defining a fluid passage therethrough; a closure member movably mounted to the housing and movable between an open position permitting the flow of fluid through the housing and a closed position preventing fluid flow through the housing; a seat on one of the housing and the closure member and a cooperating seal ring on the other one of the housing and the closure member, the seat and the seal ring being arranged to establish a leakproof seal when the closure member is in its closed position; the seal ring comprising first and second, flat, coaxial laminations constructed of a metal and having opposing surfaces in mutual abutment, the laminations having radially inner and outer edges, one of the edges including means for cooperating with the seat and a weld applied to the other edges of the laminations, the weld being applied to maintain the laminations flat, the surfaces in substantial mutual abutment, and establishing a leakproof seal preventing the passage of any fluid past the weld and therewith past the opposing surfaces of the laminations; and means for mounting the seal ring to one of the housing and the closure member, the mounting means including means applying an axially oriented pressure to the laminations biasing them towards and one lamination into abutment with a supporting face, a groove formed in the supporting face and positioned so that the one lamination covers the groove, and a graphite gasket disposed in the groove and in contact with the one lamination for preventing leakage of fluid past the gasket.

10. A valve according to claim 9 wherein the graphite gasket substantially completely fills the groove.

11. A valve according to claim 9 wherein the closure member is a pivotally mounted valve disc and defines the seat, wherein the seal ring is mounted to the housing, and wherein the weld is formed along the outer edges of the laminations.

12. A valve according to claim 11 wherein the inner edges of the laminations include curved metal sections arranged to sealingly engage the seat.

13. A valve according to claim 12 wherein the curved sections of the laminations curve in opposite directions.

14. A valve according to claim 11 wherein the mounting means further includes a retainer ring removably secured to the housing in substantial axial alignment with the seal ring, and means carried by the retainer ring for applying an axial force biasing the seal ring against the support face.

15. A valve according to claim 14 wherein the force applying means comprises a pressure ring between the retaining ring and the seal ring, and a plurality of axially oriented, threaded bolts distributed about the retaining ring and applying axially oriented forces to the pressure ring for transmission to the seal ring.

16. A valve according to claim 9 wherein the weld is formed by laser welding.

17. A valve according to claim 9 wherein the weld is formed by WIG welding.

18. A valve according to claim 9 including at least three seal ring laminations.

19. A valve comprising a housing defining an axial fluid passage therethrough; a disc mounted to the housing for pivotal movement between an open position permitting fluid flow through the passage and a closed position preventing fluid flow through the passage; and a valve seal including a seating surface on one of the housing and the closure member and a cooperating sealing arrangement on the other one of the housing and the closure member for establishing a leakproof seal when the closure member is in its closed position, the sealing arrangement including a seal ring formed by first and second, annular, flat seal ring laminations having abutting surfaces in mutual contact and axially oriented, outer surfaces, the laminations defining inner and outer, substantially circular edges, one of the edges forming a sealing surface for sealingly engaging the seat when the closure member is in its closed position, and a leakproof weld extending continuously about the other one of the edges, the weld interconnecting the laminations in a leakproof manner so that fluid seepage past the abutting surfaces of the laminations is prevented, the weld further being applied to the laminations so that the laminations retain their substantially flat shape; a support face on the other one of the housing and the closure member adapted to receive the seal ring so that one of the outer surfaces abuts the support surface; a groove formed in the surface and positioned so that it is covered by said lamination face; a graphite gasket substantially completely filling the groove and in contact with the one outer lamination surface for preventing a leakage of fluid between said lamination surface and the supporting face; and means pressuring the seal ring towards the support face for holding the seal ring to the other one of the housing and the closure member and maintaining intimate pressure contact between the graphite gasket and said one outer lamination surface; whereby a leakproof seal is established and maintained when the closure member is in its closed position when the fluid comprises a high temperature, high pressure corrosive fluid.

20. A valve according to claim 19 wherein the seal ring laminations and the weld comprise stainless steel.

21. A valve according to claim 20 wherein the weld is formed by laser welding.

22. A valve according to claim 20 wherein the weld is formed by WIG welding.

23. A valve according to claim 19 wherein the seal ring comprises at least three laminations.

24. A valve according to claim 19 wherein the support face comprises a flat surface.

25. A valve according to claim 24 including an axially movable pressure ring engaging the other one of the outer seal ring surfaces, and means for applying an axially oriented force to the pressure ring to therewith bias the seal ring against the support face and into sealing engagement with the gasket.

26. A valve according to claim 25 wherein the force applying means comprises a retainer ring axially spaced from the pressure ring and on a side thereof opposite the seal ring, and a plurality of threaded, axially oriented bolts carried by the retainer ring and applying the force to the pressure ring.

27. A valve according to claim 25 wherein the retainer ring comprises a plurality of separate retainer ring sections.

28. A valve according to claim 25 wherein the seat is formed on the closure member, wherein the support surface is defined by the housing, and wherein the seal ring, the pressure ring and the retainer ring are secured to the housing.

29. A valve according to claim 25 wherein the seal ring laminations include radially inwardly extending, oppositely curved lamination end sections formed and arranged to sealingly engage the seat on the closure member.

* * * * *